Patented Dec. 30, 1941

2,267,773

UNITED STATES PATENT OFFICE 2,267,773

COLLOIDAL DISPERSIONS OF 1,2-DIHYDRO-NAPHTHALENE POLYMER

Joseph Frederic Walker, Lewiston, N. Y., assignor to E. I. du Pont de Nemours & Company, Wilmington, Del., a corporation of Delaware No Drawing. Application September 7, 1939, Serial No. 293,811

6 Claims. (Cl. 260—32)

This invention relates to compositions containing halogenated organic compounds and more particularly to compositions containing such compounds which are modified by the addition of substances which have physical properties of the same compositions.

Various halogenated compounds and compositions containing them are useful for a variety of purposes which depend to a large measure on the physical properties of the compositions as well as on chemical and electrical properties. For example, such compositions are useful as solvents, cleaning agents, heat transfer fluids and dielectrics. For such uses the fact that in general halogenated organic compounds are partially or completely non-flammable is of considerable importance. However, in some cases when the physical properties of the halogenated compounds for particular purposes are not ideal, it is desirable to modify them to obtain desired physical properties without impairing other useful properties such as non-inflammability, dielectric properties, or the like.

It is an object of the present invention to provide new and improved compositions comprising halogenated organic compounds. A further object is to provide such compositions having increased viscosity. A further object is to provide a method for preparing a colloidal composition containing a large proportion of a halogenated organic compound which may have a viscosity varying from a low viscosity, slightly greater than that of the pure compound, to a highly viscous material or a gel. Other objects will be hereinafter apparent.

The above objects may be obtained in accordance with the present invention by forming a colloidal dispersion or colloidal solution of an infusible polymer of 1,2-dihydro-naphthalene in certain halogenated organic compounds as hereinafter set forth. The aforesaid infusible polymer of 1,2-dihydronaphthalene and its preparation is described and claimed in the copending application by Norman D. Scott, Serial No. 188,193, filed February 1, 1938, now U. S. P. 2,181,770, dated November 28, 1939. This polymer is prepared by reacting 1,2-dihydronaphthalene with a solution of an alkali metal addition compound and a polycyclic aromatic hydrocarbon (for example, the sodium addition compound of naphthalene to which may be ascribed the empirical formula: $C_{10}H_8Na_2$). The polymer obtained by this procedure has the appearance of a white amorphous powder which is substantially insoluble in all common solvents, including many aliphatic and aromatic hydrocarbons, water and the lower aliphatic alcohols. It is substantially infusible below decomposition temperatures, since when heated it does not melt at temperatures of 300 to 400° C. or below; at higher temperatures, e. g. 400 to 500° C. it softens and chars at the same time, but this does not take place until temperatures slightly below red heat (400 to 500° C.) have been attained.

In order to prepare the colloidal dispersion of the dihydronaphthalene polymer, the polymer is added in desired amount to the selected halogenated compound and the mixture is heated to a temperature not less than 200° C. The heating may be carried out under pressure if desired but ordinarily I find no advantage in operating above one atmosphere. The halogenated compound must be one which has a boiling point at atmospheric pressure of not less than 200° C. I have found that halogenated compounds having lower boiling points will not act as dispersion media to form the colloidal dispersions even when the operation is carried out at temperatures well above 200° C. and under sufficient pressure to maintain the halogenated compound in the liquid phase. Preferably the mixture is continually stirred during the heating operation until the colloidal dispersion is completed. The mixture preferably is heated at 200 to 300° C. Still higher temperatures may be used but it is inadvisable to exceed a temperature of about 400° C., as at this point decomposition of the polymer tends to occur.

The amount of the polymer which can be placed in colloidal solution by this method is relatively small and usually does not exceed 10% by weight of the mixture. The amount of polymer dispersed will vary, depending on the particular halogenated compound utilized and also on the particular grade of the polymer. For example, I have found that by varying the temperature at which the 1,2-dihydronaphthalene is polymerized the colloidal dispersibility of the polymer can be varied correspondingly; that is, by raising the polymerization temperature, I can increase the dispersibility of the resulting polymer. Thus, 1,2-dihydronaphthalene polymer prepared at about 65° C. may be dispersed to the extent of about 1.36 grams in 10 cc. of alpha-chlornaphthalene, forming a gel on cooling. If the polymer is prepared at −30° C., this dispersion will contain not more than about 0.25 gram of polymer per 10 cc.

However, I have found that even smaller amounts of the polymer, e. g., around 3%, dispersed in the halogenated organic compound often have a profound effect on the physical properties of the mixture, e. g. the viscosity. If it is desired to obtain a composition containing the maximum proportion of the polymer, the latter may be added in large excess and, after the heating or mixing step has been completed, the excess may be removed by filtering, settling, or other obvious mechanical procedure. In some cases it may not be necessary to remove the excess polymer, this depending largely upon the use for which the composition is intended.

While I have found a large number of halogenated organic compounds in which the aforesaid polymers may be satisfactorily dispersed, I have also found that many halogenated organic compounds will not cause any appreciable colloidal dispersion of the polymer when heated and stirred therewith.

After investigating various halogenated organic compounds, I have found that there are five classes of these which are suitable for dispersing the aforesaid polymer. These are as follows:

I. HALOGENATED BENZENES AND HYDROXY BENZENES HAVING AT LEAST THREE NUCLEAR HALOGENATED ATOMS

Examples

Trichlorbenzene        2,4,6-trichlorphenol
Tetrachlorbenzene      Tetrachlorphenol
Pentachlorbenzene      Pentachlorphenol
3-chlor-1,2-dibrombenzene Halogenated benzene and halogented phenols which have less than three halogen atoms are not suitable for practicing my invention. For example, it is found impossible to disperse the infusible 1,2-dihydronaphthalene polymer in substances such as p-dichlorbenzene and 2,4-dichlorphenol.

II. HALOGENATED BENZENES AND HYDROXY BENZENES HAVING NUCLEAR ALIPHATIC GROUPS AND AT LEAST TWO NUCLEAR HALOGEN ATOMS

Examples

Trichlorstyrene            Dichlorxylene
Tetrachlorstyrene          Trichlorxylene
Ethyl tetrachlorbenzene    Isopropyl trichlorbenzene
Ethyl pentachlorbenzene    4,6-dichlor-o-cresol
2,5-dichlorbenzal chloride Ethyl tribromphenol As shown by the above examples, the dispersion media in this group include benzenes and phenols which have one or more aliphatic radicals attached to the benzene ring and which also contain in the ring at least two halogen atoms. In such suitable dispersing agents, one or more halogen atoms also may be substituted in the aliphatic side chains. The aliphatic side chains may be saturated (alkyl) or unsaturated.

III. HALOGENATED POLYCYCLIC AROMATIC HYDROCARBONS HAVING ONE OR MORE NUCLEAR HALOGEN ATOMS

Examples

Polyhalogenated naphthalenes ("Halowaxes")
Halogenated diphenyls ("Aroclors")
Alpha-chlornaphthalene    2-chlordiphenyl
Alpha-brom-naphthalene    4-chlordiphenyl
Alpha-iodo-naphthalene    1-chloranthracene
Alpha-fluor-naphthalene The halogenated compounds belonging to this group are aromatic compounds having more than one benzene ring. The group includes compounds which have condensed benzene rings such as naphthalene and phenanthrene, those in which the benzene rings are connected by carbon-carbon linkage (e. g. halogenated diphenyls) and those in which the rings are connected by aliphatic carbon chains (e. g. halogenated dibenzyls). In the appended claims, the term "polycyclic aromatic hydrocarbons" is used generically to define these three types. I have found that any of these compounds which have one or more halogen atoms in a ring will act as dispersion media in the present invention. This group also includes the halogenated hydroxy derivatives of the above polycyclic hydrocarbons, e. g. halogenated naphthols and others having hydroxy radicals in the ring. Also if there are aliphatic side chains these also may contain one or more halogen atoms or no halogen atoms. It is essential, however, that at least one halogen atom be in an aromatic ring.

IV. AROMATIC-ALIPHATIC ETHERS HAVING AT LEAST ONE HALOGEN ATOM IN THE AROMATIC RADICAL AND HAVING AT LEAST TWO CARBON ATOMS IN THE ALIPHATIC RADICAL

Examples o-Chlorphenetole      2,4-dichlorphenetole
m-Chlorphenetole      2,4-diiodophenetole
o-Iodophenetole       2,6-dibromphenetole
                      2,4,5-trichlorphenetole In the compounds of this group, it is essential that the aliphatic portion of the ether have at least two carbon atoms. The aromatic portion may have one or more nuclear halogen atoms. For example, o-brom anisole does not act as a dispersing agent whereas the corresponding monohalogenated phenetoles are suitable.

V. ALIPHATIC HYDROCARBONS HAVING AT LEAST THREE CARBON ATOMS AND NOT LESS THAN 30% BY WEIGHT OF HALOGEN

Examples

Hexachlorpropene       Dichlorheptane
Heptachlorpropane      Dibromheptane
Pentachlorbutane       Monobromoctane
Tetrachlorpentane      Dichlornonane
Trichlorhexane         Dichlordecane
Tribromhexane It is understood that all halogenated aliphatic hydrocarbons which contain three or more carbon atoms and 30% or more of halogen will not act as dispersing agents; but this group is restricted, as are all the dispersion media of the present invention, to those compounds which have a boiling point of not lower than 200° C. at one atmosphere. Thus I have attempted to utilize such halogenated hydrocarbons as carbon tetrachloride, trichlorethylene, tetrachlorpropane, dichlorbutane and others, all having boiling points below 200° C. at one atmosphere, and I have found that these do not act as dispersion agents in accordance with my invention, even when the mixtures are heated at temperatures well above 200° C. and under sufficient pressure to maintain the halogenated compounds in the liquid phase.

It should be understood that the halogenated compounds of the above five classes which are suitable for preparing the colloidal dispersions of the present invention are limited to those which have boiling points at atmospheric pressure of not lower than 200° C.

Compositions prepared in accordance with the present invention are useful for a variety of purposes, especially where a viscosity higher than that of the pure halogenated compound is a desirable characteristic. For example, a number of halogenated hydrocarbons, for example the halogenated alkyl benzenes, are known to have excellent dielectric properties. For certain dielectric uses, it is desirable to have a dielectric of high viscosity and it is often desired to have as dielectric material a substance which is semi-solid or gel-like. This is especially true, for example when the dielectric is used to impregnate paper or a similar base and where a relatively high viscosity is essential to prevent the dielectric material from flowing from the support and collecting at the bottom of the electrical apparatus. Also, a highly viscous dielectric or a moderately viscous dielectric is often desirable to minimize the leakage of the dielectric material from the electrical apparatus. For such purposes compositions made according to the present invention are excellently suited. For example, I may disperse the infusible 1,2-dihydronaphthalene polymer in chlorinated alkyl benzenes such as ethyltetrachlorbenzene, ethylpentachlorbenzene or mixtures of these, chlorinated styrenes and chlorinated benzenes such as trichlorbenzene or various mixtures of any of these chlorinated compounds. By varying the amount of the polymer dispersed, I may produce compositions having degrees of viscosity varying from liquids with relatively low viscosities up to high-viscosity gels. High viscosity compositions made by this method are excellently well adapted to impregnate paper, fabric, or other suitable bases in dielectric apparatus, for example in condensers. Various other uses and adaptations of compositions which may be produced by my invention will be apparent from the above description.

I claim:

1. A composition of matter comprising a colloidal dispersion of the infusible polymer of 1,2-dihydronaphthalene in a halogenated organic compound having a boiling point not lower than 200° C. at one atmosphere and which is selected from the group consisting of: (1) halogenated benzenes and hydroxy benzenes having at least three nuclear halogen atoms; (2) halogenated benzenes and hydroxy benzenes having at least one nuclear aliphatic radical and at least two nuclear halogen atoms, (3) halogenated polycyclic aromatic hydrocarbons having at least one nuclear halogen atom, (4) halogenated polycyclic aromatic hydrocarbons having at least one nuclear hydrogen substituted by a hydroxy radical and at least one nuclear halogen atom; (5) halogenated polycyclic aromatic hydrocarbons having at least one nuclear aliphatic radical and at least one nuclear halogen atom; (6) halogenated aromatic-aliphatic ethers having at least one halogen atom in the aromatic radical and at least two carbon atoms in the aliphatic radical; and (7) wholly aliphatic halogenated hydrocarbons having at least three carbon atoms and not less than 30% by weight of halogen.

2. A composition of matter comprising a colloidal dispersion of the infusible polymer of 1,2-dihydronaphthalene in a halogenated alkylated benzene having at least two nuclear halogen atoms.

3. A composition of matter comprising a colloidal dispersion of the infusible polymer of 1,2-dihydronaphthalene in a chlorinated alkylated benzene having at least two nuclear chlorine atoms.

4. A composition of matter comprising a colloidal dispersion of the infusible polymer of 1,2-dihydronaphthalene in a mixture of ethyl tetrachlorbenzene and ethyl pentachlorbenzene.

5. A composition of matter comprising a colloidal dispersion of the infusible polymer of 1,2-dihydronaphthalene in a halogenated naphthalene.

6. A composition of matter comprising a colloidal dispersion of the infusible polymer of 1,2-dihydronaphthalene in alpha-chlornaphthalene.

JOSEPH FREDERIC WALKER.